United States Patent [19]

Kinsley, Jr.

[11] 4,355,081

[45] Oct. 19, 1982

[54] CURING OF RESIN IMPREGNATED CELLULOSICS WITH CONTINUOUSLY SUPERHEATED STEAM

[75] Inventor: Homan B. Kinsley, Jr., Powhatan, Va.

[73] Assignee: James River Corporation, Richmond, Va.

[21] Appl. No.: 155,117

[22] Filed: May 30, 1980

[51] Int. Cl.³ .............................................. B32B 27/42
[52] U.S. Cl. ................................... 428/526; 162/165; 162/166; 427/377; 427/389.9; 427/391; 428/530
[58] Field of Search ...................... 427/377, 389.9, 391; 162/166, 165; 428/530, 526

[56] References Cited

U.S. PATENT DOCUMENTS

| | | | |
|---|---|---|---|
| 983,327 | 2/1911 | Thoma | 427/377 |
| 2,565,152 | 8/1951 | Wachter et al. | 427/377 |
| 2,859,136 | 11/1958 | Marsh et al. | 427/377 |
| 3,100,159 | 8/1963 | Ullman | 427/377 |

*Primary Examiner*—Michael R. Lusignan
*Assistant Examiner*—Janyce A. Bell
*Attorney, Agent, or Firm*—Burns, Doane, Swecker & Mathis

[57] ABSTRACT

A curable resin, e.g., a phenol-aldehyde resin, of a resin impregnated cellulosic substrate, e.g., paper, is cured by contacting said substrate with high temperature steam in a continuous superheated state. The resulting product exhibits superior physical properties, e.g., improved wet properties such as boiled tensile strength.

25 Claims, 1 Drawing Figure

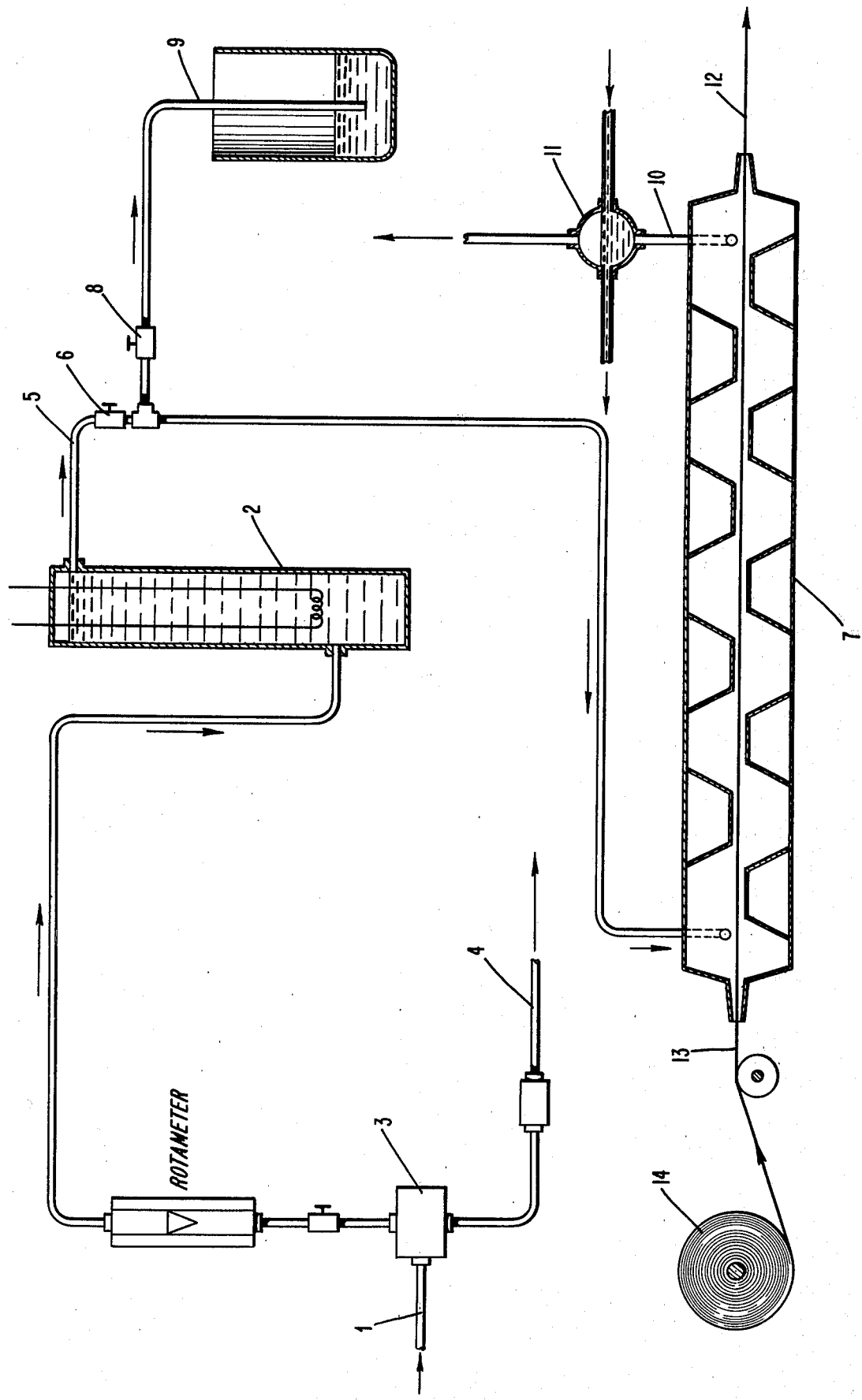

CURING OF RESIN IMPREGNATED CELLULOSICS WITH CONTINUOUSLY SUPERHEATED STEAM

BACKGROUND OF THE INVENTION

1. Field of the Invention

This invention relates to a novel process for curing a resin-impregnated cellulosic substrate by employing continuously superheated steam. This invention is particularly applicable to the curing of a phenolic resin impregnated paper to thereby afford a cured paper product having improved wet properties.

2. Description of the Prior Art

The impregnation of substrates with synthetic resins to alter and, hopefully, improve certain properties of said substrate is well known in the art. For instance, in the paper industry it is known to treat the fibers of a cellulosic material with various synthetic resins, i.e., urea-formaldehyde resin, melamine resin, phenol-formaldehyde resin, and the like, to produce cellulose products having improved wet properties (e.g., boil strength). Once the cellulose material has been impregnated with the resin, the impregnated substrate is generally subjected to a treatment to effect curing of said resin.

Many different methods of curing resin impregnated cellulose substrates are known and recognized in the art. For example, see U.S. Pat. No. 2,639,242, issued to Suen, which discloses the use of radiant heat to cure the resin. Compare U.S. Pat. No. 2,785,975, issued to Sheeran, which discloses heating a resin impregnated cellulosic substrate for twenty-four hours at 250° F. in order to cure the resin. The extended residence time of twenty-four hours is a large disadvantage of the process as the process tends to be too time consuming. More conventional methods have thus employed a higher temperature of about 300° F. in order to shorten the residence time to about 15 minutes in a hot air oven. A 15-minute cure time, however, is also somewhat time consuming and a still shorter residence time would be desirable.

U.S. Pat. No. 3,761,977, issued to Rappoport, discloses the use of steam for treating and curing textiles, but not resin impregnated cellulosic substrates. The steam is employed at high pressures, i.e., about 5 psig., and is passed through the textile substrate. The passage of steam directly through a cellulosic substrate, however, is not always plausible or possible as the substrate may be harmed, particularly at high pressures. The use of a high pressure is also disadvantageous as it requires the use of special pressure equipment.

U.S. Pat. No. 2,565,152, issued to Wachter et al, discloses the use of saturated steam to not actually cure the resin, but provide increased penetration of the phenolic resin into the fibrous material upon condensation of the steam onto the substrate. Subsequent to the steam treatment, the cellulose substrate is heated in an oven to remove the water and also cure the resin. The patent discloses that the steam treatment reduces the gelation time of the resin.

In addition to the aforementioned problems and disadvantages, the prior art processes have also failed to address the problems of recovering the vaporous by-products of the curing process, e.g., phenol vapors, in a commercially acceptable manner. Generally, these vapors are merely dispersed and lost to the atmosphere, which can have a detrimental ecological impact.

Furthermore, although conventionally cured resin impregnated cellulose substrates do show somewhat improved wet properties, the hard-cured paper obtained is generally brittle and of inferior flex properties.

Accordingly, it is a major object of this invention to provide a novel process for curing a resin impregnated cellulosic substrate which is devoid of the aforenoted disadvantages of the prior art.

Another object of this invention is to provide a process for curing a resin impregnated cellulosic substrate which will afford the cured product improved physical properties.

Another object of this invention is to provide a process for curing a resin impregnated cellulosic substrate wherein all of the vaporous by-products of the curing process can be completely and easily recovered.

Another object of this invention is to provide a process for curing a resin impregnated cellulosic substrate which requires only a short residence time.

Still another object of this invention is to provide a curing process for a resin impregnated cellulosic substrate which can be run effectively under low pressures, i.e., less than 5 psig.

Other objects, features and the advantages of this invention will become apparent to those skilled in the art upon a study of this disclosure, the appended claims, and the drawing.

SUMMARY OF THE INVENTION

In accordance with the objectives of this invention, it has surprisingly been discovered that a cellulosic substrate, e.g., paper, impregnated with a resin can be afforded superior physical properties by curing the impregnated resin with high temperature, continuously superheated steam. The curable resin containing substrate is contacted with an effective amount of superheated steam at a temperature sufficient to insure complete curing of the resin without any condensation of steam occuring on the substrate.

BRIEF DESCRIPTION OF THE FIGURE

The FIGURE of the drawing schematically illustrates a particular equipment arrangement suitable for carrying out the process of the instant invention.

DETAILED DESCRIPTION OF THE PREFERRED EMBODIMENTS

More particularly, the process of the instant invention relates to the curing of any curable resin, i.e., a resin which can be further cured or cross-linked, when impregnated in a cellulosic substrate such as paper. Examples of such curable resins are melamine resin, urea-formaldehyde resin, thermal setting polyester resins and phenolic resins.

The present invention has particular applicability to the curing of paper impregnated with a phenol-aldehyde resin. Phenol-aldehyde resins are well known in the art and are commercially available. Any commercially available phenolic resin is appropriate for the purposes of this invention, an example of which is the resin identified by the trademark Tybon 975 available from Pacific Resins and Chemicals Inc.. The Pacific 975 phenol-aldehyde resin has a number average molecular weight ($M_m$) of about 300, a weight average molecular weight ($M_w$) of about 2230, and about 1.07 methylol groups per average molecule.

It should be emphasized, that the phenol-aldehyde resin to be cured can be in the A stage or B stage, as defined by Baekeland. If the resin is in the A stage, curing by the process of the instant invention can advance the resin to the B stage or beyond, even to the C stage. If the phenol-aldehyde resin is in the B stage, application of the process of the instant invention will further cure said resin and thus advance it beyond the B stage, and if desired, to the C stage. Generally, the process of the instant invention can be employed to cure any curable resin that has been applied to a cellulosic, i.e., paper, substrate to the degree of cure desired and still benefit from the effectiveness and efficiency of the process.

The curable resins can be applied to the substrate neat or in an organic solvent. For example, a phenol-aldehyde resin can be applied to a paper substrate in a methanol solvent to thus allow impregnation of the paper substrate by the resin. The organic solvent is, however, removed from the substrate prior to the curing of the resin.

The resin, either neat or in a solution, can be applied to the substrate by any conventional means. For example, application of the resin to the substrate can be accomplished by a twin roll coater comprising a doctor roll to determine the thickness of the resin coat applied. The paper substrate is merely placed between two rolls which coat their respective sides of the substrate. If only one side of the substrate is to be coated, one of the two rolls can be run dry so the resin is applied to only one side.

As indicated before, if the resin is applied in a solvent, the solvent is removed prior to the curing process. Other operations can also be performed on the paper substrate prior to curing, such as wind-up and corrugation of the paper.

The process for curing the resin of the resin impregnated cellulosic substrate comprises subjecting said substrate to curing temperatures by contacting the resin with an effective amount of steam being in a superheated state and at a temperature sufficient to effect the cure of said resin. The substrate is maintained in contact with the superheated steam for a period of time sufficient to effect the desired cure without having any condensation of steam occur on said substrate. This requires that the superheated steam never cool to its saturated temperature and thus never condense on the substrate. In other words, the steam maintains its superheated state throughout the contacting and thus remains continuously superheated. All the energy for curing the resin, therefore, is derived from the cooling of the superheated steam to a lower degree of superheatedness, no latent heat is employed. The impregnated substrate, therefore, is not moistened by the process as it does not pick up any water due to condensation of the superheated steam. When working with a paper substrate, this is extremely important as additional moisture can deleteriously affect the substrate if the moisture content exceeds acceptable standards. Thus, by employing continuously superheated steam, i.e., superheated steam which maintains a superheated state throughout the contacting so that when the steam last contacts the impregnated substrate the steam is still in a superheated state, the problem of adding moisture is avoided by the process of the present invention.

The steam can be maintained continuously in its superheated state throughout the contacting by employing an initial superheated steam temperature sufficient to effect a cure of the resin impregnated substrate yet preclude the concomitant condensation of the steam on the substrate for a period of time sufficient to effect said cure. Superheated steam temperatures which are generally sufficient to insure the curing of the resin, yet avoid the condensation of steam on the substrate, have been found to be those above about 300° F. A temperature on the order of about 1200° F. would be preferred due to its high energy content, however, temperatures less than 1200° F., e.g., in the range of about 300°–1200° F., are more practical due to considerations of the heat energy required to raise the steam to that temperature and special equipment required to handle the high temperature superheated steam. Temperatures in the range of about 550°–700° F. are the most preferred as being of sufficient energy to cure the resin yet allow the steam to maintain sufficient superheat to preclude condensation. Temperatures in the range of about 550°–700° F. can be easily reached and do not require special equipment for handling the superheated steam.

The amount of steam employed is an amount effective to insure the curing of the resin to the desired degree and allow the steam to remain continuously superheated so that none of the steam condenses on the substrate. Generally, the steam flow should be sufficient to raise the temperature of the substrate to the temperature of the superheated steam upon exit of the substrate from the oven. In other words, the temperature of the substrate leaving the oven should be about the same as that of the exit steam. Of course, the effective amount will vary depending on the temperature of the superheated steam employed, and the amount and type of resin to be cured. Less steam is required when employing a higher temperature superheated steam than that required for a lower temperature, less energy containing, superheated steam.

Generally, however, it has been found that, per pound of impregnated or coated paper substrate, about 15 pounds or less, and more preferably from about two to about 10 pounds, and most preferably about four to five pounds, of steam of a temperature of at least about 300° F. is effective to cure a resin to the extent that the coated substrate has physical properties at least as good as, or somewhat comparable to those obtained from a 15 minute cure in a conventional hot air oven at 300° F. This is particularly true when subjecting a resin impregnated paper, e.g., a phenol-aldehyde resin impregnated paper, to the steam cure process and the amount of resin on the paper substrate comprises about 5 to about 35 percent of the total weight of paper and resin, and most particularly when the temperature of the steam employed is in the range from about 550°–700° F. Upon raising or lowering the temperature of the steam, one skilled in the art could easily determine the optimum effective amount of steam required to achieve curing without concomitant condensation of the superheated steam on the substrate.

The amount of time the resin coated substrate must remain in contact with the superheated steam to achieve the desired results can vary greatly and will depend upon the superheated steam temperature, the type and amount of resin to be cured, and the degree of cure desired, e.g., a partial cure, full cure, or, for phenol-aldehyde resins, to the B stage, C stage, or somewhere in between. For phenol-aldehyde resin impregnated paper containing up to about 35 percent of the total weight of resin, and particularly for phenol-aldehyde resins that have been already advanced to the B stage, it has been found that generally a six to twelve, more preferably an eight to ten, and most preferably, about a nine second residence time is sufficient to give a commercially acceptable cure when the temperature of the steam is above 300° F., and preferably in the range of about 550°-700° F. By commercially acceptable cure, it is meant that the properties of the cured resin coated paper, particularly the wet properties, are at least comparable to those obtained from a conventional cure, i.e., about 15 minutes in a hot air oven at about 300° F.

Herein lies one of the advantages of the instant invention, namely, the shorter residence time as compared to conventional processes such as the conventional hot air oven curing process. The shorter residence time is possible due to the higher temperatures employed, up to 1200° F., due to the use of the superheated steam. The use of such high temperatures in the presence of air would lend itself to deleterious results such as charring of the paper or oxidation of the product.

The type of cure obtained is superior to that obtained by conventional methods, e.g., a hot air oven. There are upper operational limits in using a conventional hot air oven due to product oxidation and subsequent degradation of the product's physical properties. The use of superheated steam, however, allows one to cure at higher temperatures without such danger of product oxidation. Moreover, the higher curing temperatures have been observed to yield a cured resin with a different, i.e., novel, molecular structure, particularly when said resin is a phenol-aldehyde resin. The superior nature of the physical properties of the product produced by the superheated steam treatment of the instant invention, and in particular when a phenol-aldehyde resin has been cured thereby, is thought to be due to the combination of less product oxidation and a unique cured resin structure.

Referring to the FIGURE in the drawing, steam from a steam source is carried via conduit 1 to a superheater 2 wherein the steam is heated to its ultimate predetermined temperature. The source of the steam can be any available steam source, e.g., steam from an industrial plant, etc. Any conventional superheater can also be employed which will heat the steam to the desired temperature in its superheated state. An example of such a superheater is a 24 kilowatt electric superheater. Optionally, a steam separator 3 can be employed to separate any water or moisture that the steam contains. The use of the steam separator is preferred in order to increase the efficiency of the steam superheater as it takes a great deal of additional energy to convert water into steam as opposed to just heating the steam to its ultimate temperature. Separated water can be removed via conduit 4.

Once the steam has reached its predetermined temperature, the steam in its superheated state exits from the superheater via conduit 5 and passes to the oven or curing chamber where the impregnated cellulosic substrate will be contacted with the steam. During said passage, the steam passes through a throttling valve 6, which is used to control the pressure of the steam. The contacting of the superheated steam with the substrate is preferably run at low pressures, e.g., 5 psig. or less. Higher pressures can be employed if so desired, however, it is preferred to run the process at these low pressures in order to simplify the apparatus employed and avert damage of the substrate. If higher pressures were used, a pressure vessel would have to be employed and there would be a problem with steam leaks, particularly at the end seals. These problems can be avoided by employing the process of the instant invention at low pressures. If desired, even a slight vacuum can be employed in the oven or steam chamber.

It is also preferred to utilize a safety valve 8 in case the pressure of the steam does become too great. The steam can then pass through the safety valve via conduit 9 to a tank of water or some other appropriate means to condense any excess steam.

The oven 7 can comprise any vessel, chamber or structure known in the art capable of maintaining the steam atmosphere under the pressures employed. Of course, said structure should be insulated to obviate the problem of loss of heat energy to the surrounding environment to as great an extent as possible.

Preferably, the apparatus comprises an essentially closed treatment chamber with means for periodically interrupting and then redirecting the flow of superheated steam, with said means being internal baffles. The baffles are alternately positioned on the top and the bottom of the oven so that each spacing between two upper baffles is positioned directly above a lower baffle and each spacing between two lower baffles is positioned directly below an upper baffle. Not only is good steam-paper contact assured thereby, but the paper substrate is stabilized in its passage through the oven due to this positioning of the baffles as the paper substrate passes through alternating zones of high and low velocity steam.

The oven can also contain a carrier wire or grid to support the sheet upon its passage through the oven. If employed, this grid should move about five percent faster than the paper substrate to prevent a wire or support pattern mark on the sheet. Also, it is preferred that the sheet enter and leave the oven through a nip to prevent steam losses, with said nip rolls being coated with a non-stick resin polymer, e.g., Teflon, to prevent sticking problems.

It is preferred that the oven be constructed to allow a residence time of about 9 seconds. This will allow for a commercially acceptable cure of the resin when employing superheated steam in the temperature range of about 300°-1200° F., or more particularly, in the range of about 550°-700° F. Thus a substrate feed of 200 ft./min. would require a 30 ft. oven while a 300 ft./min. running speed would require a 45 ft. oven. If the speed is in the 200 ft./min. or greater range, a multipass oven is preferred.

Upon entering the steam chamber, the steam continuously flows, preferably, co-currently with the paper substrate. Co-current flow is preferred in order that the hottest steam contacts the paper substrate initially to begin the curing process. If desired, however, countercurrent flow of the steam with respect to the paper substrate can also be employed.

Although the drawing depicts the steam entering only on one side of the paper substrate, if desired, means can be easily provided so that the steam can enter on both sides of the substrate. This would be preferred if both sides of the substrate were impregnated with resin.

The paper entering the oven is unwound from roll 14, enters the oven at 13, and leaves the oven at 12. A type of paper which can be passed through the oven and to which the process of the instant invention is applicable is any suitable cellulosic substrate known to be coated or would have reason to be coated with a curable resin, and can stand or hold up to the high temperatures employed. The process is particularly applicable for low density paper having a 60 to 90 percent pore volume, such as that paper generally employed as filter paper. Said paper is generally coated with a curable resin such as a phenol-aldehyde resin as is well known in the art.

The superheated steam, upon disengaging contact with the paper substrate, exits the steam chamber via conduit 10. The superheated steam can then be condensed, for example, by adding cold water via conduit 11. The ease with which the superheated steam can be condensed provides a very efficient method for recovering all of the vaporous by-products formed during the curing process so that they are not dissipated to the atmosphere. This is one of the major advantages of the instant invention in that it provides one with an effective and cost efficient method for preventing the exhaustion of toxic chemicals to the atmosphere. For instance, in the case of a phenol-aldehyde resin, e.g., based on a 20 percent resin content by weight of the paper, up to 2 percent by weight or more of phenol and other phenolic components, such as saligenin, are volatilized. Upon condensation of the superheated steam, all of such volatilized by-products are recovered.

The curing of the phenol-aldehyde resin in accordance with the process of the present invention also results in a product which surprisingly exhibits superior wet properties as compared to those products obtained by conventional methods, i.e, such as curing in a hot air oven. As well, a product can be obtained which also exhibits superior flex as well as superior wet properties. This is a unique combination of properties as generally a cured resin impregnated substrate having superior wet properties is brittle and exhibits extremely low flex properties.

As an example, a combination of good wet properties and flex properties can be obtained when a phenol-aldehyde resin impregnated paper is contacted with superheated steam of a temperature in the range of about 550°–700° F. for about 12 seconds or less. Contact for 18 seconds or more, for some reason, no longer produces a product exhibiting superior flex properties, but still yields a product having superior wet properties.

The reason for the improvement in both physical properties is unclear. One can speculate, however, that the explanation is found in the two types of linkages that are obtained upon curing a phenol-aldehyde resin and the novelty of the cured phenol-aldehyde resin obtained via the instant invention. The following, however, is just a theory and applicant does not wish to be bound thereby.

In the curing of phenol-aldehyde resins, two types of reactions generally occur. One results in a polymer having methylene linkages between the phenolic moieties while the other results in a polymer having ether linkages. The methylene linkage generally occurs upon the reaction of a methylol group of one phenolic moiety with an ortho- or para-ring hydrogen of another phenolic moiety, whereas the ether linkage is obtained upon the reaction between two methylol groups. Both reactions occur with the elimination of water. Both types of linkages are thought to be present upon low temperature curing.

At higher temperatures, however, i.e., above 340° F., the ether linkages, upon the elimination of formaldehyde, are thought to be transformed into a methylene linkage, which may be more flexible and resistant to change than the ether linkage. The higher temperatures employed in the present invention, therefore, may provide a novel crosslinked or cured phenolic resin with predominantly methylene linkages. The predominance of the methylene linkages and their stability, as well as flexibility, would explain the increase in wet and flex properties. Excessive heating, however, may favor the formation of a more cross-linked product, or the transformation of the ether linkage into a quinone type product, which detracts from the flexibility yet allows the cured resin to maintain its superior wet properties. Thus, when the impregnated paper substrate is contacted with superheated steam for an extended period of time, only superior wet properties are observed.

It should be appreciated that these same beneficial properties manifest in such cured phenolic resin also makes the curing process of the instant invention most advantageously applicable to substrates in general, e.g., cloth, polymeric films, non-woven or woven fabrics, which have been impregnated with a phenol-aldehyde resin, as the resulting products would also exhibit the benefits therefrom.

The following examples are given as specific illustrations of the claimed invention. It should be understood, however, that the specific details set forth in the examples are merely illustrative and in nowise limitative. All parts and percentages in the examples and the remainder of the specification are by weight unless otherwise specified.

The tests run in evaluating the products obtained in the following examples are the following:

Tensile breaking strength, measured in units of lb./in., was determined in accordance with ASTM D828-60.

Bursting strength (Burst test), measured in units of p.s.i., was determined in accordance with ASTM D774-63T.

The flexibility of the product, or Flex No., was determined by the following procedure:

The upper edge of a 2"×5" piece of paper is clamped in a fixture that is capable of undergoing a 90° rotation to the right, a return to its original position, a 90° rotation to the left, and a return to the original position. The lower edge of the paper is clamped to a 3 pound weight. The number of times the sheet can be flexed without failure is recorded. The head undergoes 48 double folds per minute.

The Gurley Stiffness was determined by the following procedure:

The paper to be tested is cut to a 1.5×2.75 inch sample size. The paper is clamped in an arm fixture. The arm is then rotated left or right so that the lower edge of the paper contacts a counterweighted arm. The height to which the arm can be moved by the paper is noted by the operator. The test is then repeated in the opposite direction. The average of the two values is multiplied by the counterweight factor (supplied with the Gurley Stiffness tester instrument). This product is the Gurley Stiffness value for the paper in mg.

The Boiled Properties of the products were determined by first cutting the paper to be tested to the proper dimensions for the test to be run, submerging the test specimen in boiling water for 10 minutes, and then subjecting the boiled test specimen to the test of interest, i.e., the Tensile, Burst or Gurley Stiffness test.

The basis weight of the paper is a value corresponding to the total weight of paper, including resin, in lbs. per 3,000 ft.$^2$ of the paper.

EXAMPLE 1

10 sheets of paper impregnated with about 20% by weight "B" stage phenol-aldehyde resin were subjected to a temperature of 300° F. in a hot air MUFFEL furnace for 15 minutes, another 10 sheets for 5 seconds at 675° F., and another 10 sheets for 10 seconds at 550° F. The temperature was recorded with a mercury thermometer in the oven.

The dry and boiled properties of the cured sheets of paper were then measured. The following table summarizes the results of the tests. The table records the average value of all 10 sheets.

TABLE I

|  | Cure Time (Min.) | Cure Temp. (°F.) | Oven Type | Tensile (lb./ inch) | Boiled Tensile (lb/inch) | Burst (psi) | Boiled Burst (psi) |
|---|---|---|---|---|---|---|---|
| Control | 15 | 300 | Air | 23.6 | 19.5 | 27.9 | 10.1 |
|  | 0.17 (10 sec) | 550 | Air | 17.3 | 19.8 | 26.8 | 12.7 |
|  | 0.08 (5 sec) | 675 | Air | 18.8 | 18.1 | 24.5 | 11.3 |
| [Following data expressed as percent of value obtained in control run] | | | | | | | |
| Control | 15 | 300 | Air | 100 | 100 | 100 | 100 |
|  | 0.17 (10 sec) | 550 | Air | 74 | 102 | 96 | 116 |
|  | 0.08 (5 sec) | 675 | Air | 80 | 93 | 88 | 104 |

EXAMPLE 2

A paper impregnated with about 20% by weight of "B" stage phenol-aldehyde resin was passed through a 6 ft.×1 ft.×1 ft. superheated steam oven at a speed of 20 ft./min. The basis weight of the paper was 75.9 lbs. The superheated steam was passed through the oven at a rate of 350 lb./hr. The dry and boiled physical properties of the resulting paper were then evaluated.

As a control, a sheet of the same impregnated paper was heated in a hot air MUFFEL furnace for 15 minutes at a temperature of about 300° F. Similarly, the physical properties of the control sheet were evaluated.

Table II summarizes the results.

TABLE II

|  | Cure Time (Min) | Cure Temp. (°F.) | Oven Type | Tensile (lb/inch) | Boiled Tensile (lb./inch) | Burst (psi) | Boiled Burst (psi) | Flex (no.) |
|---|---|---|---|---|---|---|---|---|
| Control | 15 | 300 | Air | 35.5 | 15.7 | 35.7 | 23.3 | 742 |
|  | 0.30 (18 sec.) | 587* | Steam | 36.1 | 21.7 | 38.9 | 34.0 | 316 |
| [Following data expressed as percent of value obtained in control run] | | | | | | | | |
| Control | 15 | 300 | Air | 100 | 100 | 100 | 100 | 100 |
|  | 0.30 (18 sec.) | 587* | Steam | 102 | 138 | 110 | 146 | 43 |

*Temperature of steam upon initial contact with paper substrate.

EXAMPLE 3

A paper impregnated with about 20% by weight of "B" stage phenol-aldehyde resin was passed through a 6 ft.×1 ft.×1 ft. superheated steam oven at a speed of 40 ft./min. The basis weight of the paper was 83.6 lbs. The steam flow through the oven was 286 lb./min. The dry and boiled properties of the paper, including flex, were then evaluated.

As a control, a sheet of the same impregnated paper was heated in a hot air oven for 15 minutes at 300° F. The properties of the resulting product were also determined.

Table III summarizes the results.

TABLE III

|  | Cure Time (Min) | Cure Temp. (°F.) | Oven Type | Tensile (lb./inch) | Boiled Tensile (lb./inch) | Burst (psi) | Boiled Burst (psi) | Flex (no.) |
|---|---|---|---|---|---|---|---|---|
| Control | 15 | 300 | Air | 48.9 | 23.2 | 43.3 | 30.1 | 128 |
|  | 0.15 (9 sec) | 585* | Steam | 45.3 | 26.7 | 46.1 | 39.8 | 248 |
| [Following data expressed as percent of value obtained in the control run] | | | | | | | | |
| Control | 15 | 300 | Air | 100 | 100 | 100 | 100 | 100 |
|  | 0.15 (9 sec) | 585* | Steam | 93 | 115 | 106 | 132 | 194 |

*Temperature of steam upon initial contact with paper substrate.

EXAMPLE 4

A paper impregnated with about 20% by weight of "B" stage phenol-aldehyde resin was passed through a 6 ft.×1 ft.×1 ft. superheated steam oven at 30 ft./min. per The basis weight of the paper was about 80 lbs. The steam flow was 190 lb./hr. The boiled burst, flex, Gurley stiffness and boiled Gurley stiffness properties were evaluated.

As a control, a sheet of the same impregnated paper was heated in a hot air oven for 15 minutes at a temperature of about 300° F. The control cured paper underwent the same physical property evaluations as the superheated steam cured product, except for the Gurley stiffness.

Table IV summarizes the results.

TABLE IV

| Cure Time (Min.) | Cure Temp. (°F.) | Oven Type | Tensile (lb./inch) | Boiled Tensile (lb./in.) | Burst (psi) | Boiled Burst (psi) | Flex (No.) | Stiffness (mg.) | Boiled Stiffness (mg.) |
|---|---|---|---|---|---|---|---|---|---|
| Control: 15 | 300 | Air | — | — | — | 25 | 1631 | — | 630 |
| 0.20 (12 sec) | 659* | Steam | — | — | — | 31 | 1800 | 3920 | 1330 |
| [Data expressed as percent of value obtained] | | | | | | | | | |
| Control: 15 | 300 | Air | — | — | — | 100 | 100 | — | 100 |
| 0.20 (12 sec) | 659* | Steam | — | — | — | 124 | 110 | — | 211 |

*Temperature of superheated steam upon initial contact with paper substrate.

As can be seen from the data, all of the boiled properties of the product produced by the superheated steam treatment were superior to the boiled properties of the product produced by treatment for 15 minutes in a conventional air oven. The flex properties as well as the boiled properties of the products produced by the superheated steam treatment were also superior to the flex properties of the product produced by the conventional air oven when the residence time of the impregnated paper in the superheated steam oven was less than 18 seconds, and particularly 9 seconds, at a superheated steam temperature in the range of about 550°-700° F.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed:

1. A process for curing a curable, organic solvent soluble and thermosetting resin impregnated non-textile cellulosic substrate comprising contacting such substrate with an effective amount of a gaseous medium consisting essentially of steam, said steam being in superheated state, and maintaining said substrate in contact with the superheated steam, while also maintaining the steam in said superheated state, for a period of time sufficient to cure the resin impregnated substrate without concomitant condensation of said superheated steam thereon.

2. The process defined in claim 1 wherein the superheated steam is employed at a temperature of at least 300° F.

3. The process defined in claim 2 wherein said superheated steam is employed at a temperature in the range of about 300° to about 1200° F.

4. The process defined in claim 2 wherein said superheated steam is employed at a temperature in the range of about 550° to about 700° F.

5. The process defined in claim 4 wherein said resin containing substrate is contacted with said superheated steam for a period of time in the range of about 6 to about 12 seconds.

6. The process defined in claim 5 wherein said period of time is about 9 seconds.

7. The process defined in claim 1 or 4 wherein said resin is a phenolic resin and said cellulosic substrate is paper.

8. The process defined in claim 7 wherein said resin is a phenol-aldehyde resin.

9. The process defined in claim 8 wherein the amount of phenol-aldehyde resin comprises from about 5 to about 35% by weight of the total weight of resin and paper.

10. The process defined in claim 9 wherein said impregnated paper weighs from about 40 to about 250 lbs. per 3000 square feet.

11. The process defined in claim 1 or 4 wherein the pressure under which the contacting occurs is less than or equal to about 5 psig.

12. The process defined in claim 9 wherein about 2 to about 10 lbs. of superheated steam are employed for every lb. of impregnated cellulosic substrate.

13. The process defined in claim 9 wherein about 4 to about 5 lbs. of superheated steam are employed for every lb. of cellulosic substrate.

14. The process defined in claim 6 wherein the resin is a phenolic-aldehyde resin and said cellulosic substrate is paper.

15. The product obtained by the process defined in claim 8 or 12.

16. The process defined in claim 1 wherein the superheated steam is condensed subsequent to contacting the substrate to thereby recover all the vaporous by-products of the curing process.

17. A process for preparing a cured, resin impregnated paper substrate comprising applying a curable, organic solvent soluble and thermosetting resin to the substrate in an organic solvent and thereby allowing said resin to impregnate said substrate, removing said organic solvent from the substrate, and curing said resin impregnated substrate by contacting the substrate with an effective amount of a gaseous medium consisting essentially of steam, said steam being in superheated state and of a temperature sufficient to effect curing, and maintaining said substrate in contact with the superheated steam, while maintaining said steam in its superheated state, for a period of time sufficient to effect a cure of said resin impregnated substrate without concomitant condensation of said superheated steam thereon.

18. The process defined by claim 17 wherein said substrate is paper and said resin is a phenol-aldehyde resin.

19. The process defined by claim 18 wherein the superheated steam is employed at a temperature in the range of about 550° to about 700° F. and in an amount that from about 2 to about 10 lbs. of steam are employed for every lb. of impregnated paper, and said resin impregnated paper is in contact with said superheated steam for a period of time in the range from about 6 to about 12 seconds.

20. The process defined by claim 19 wherein about 4 to about 5 lbs. of steam are employed for every lb. of paper and said contacting time is about 9 seconds.

21. The product obtained by the process defined by claim 19 or 20.

22. The product obtained upon curing a phenol-aldehyde resin impregnated non-textile substrate by contacting such substrate with an effective amount of a gaseous medium consisting essentially of steam, said steam being in superheated state, and maintaining said substrate in contact with the superheated steam, while also maintaining the steam in said superheated state, for a period of time sufficient to cure the resin impregnated substrate without concomitant condensation of said superheated steam thereon.

23. The product of claim 22 whereby the superheated steam is employed at a temperature of at least 300° F.

24. The product of claim 22 whereby the superheated steam is employed at a temperature in the range of about 550° F. to about 700° F.

25. The product of claim 24 whereby said resin containing substrate is contacted with said superheated steam for a period of time in the range of about 6 to about 12 seconds.

* * * * *